US009830516B1

(12) United States Patent
Biswas et al.

(10) Patent No.: US 9,830,516 B1
(45) Date of Patent: Nov. 28, 2017

(54) JOINT TEMPORAL SEGMENTATION AND CLASSIFICATION OF USER ACTIVITIES IN EGOCENTRIC VIDEOS

(71) Applicant: YEN4KEN, INC., Princeton, NJ (US)

(72) Inventors: Sovan Biswas, Kolkata (IN); Ankit Gandhi, Raipur (IN); Arijit Biswas, Kolkata (IN); Om D Deshmukh, Bangalore (IN)

(73) Assignee: VideoKen, Inc., Princeton, NJ (US)

( * ) Notice: Subject to any disclaimer, the term of this patent is extended or adjusted under 35 U.S.C. 154(b) by 42 days.

(21) Appl. No.: 15/203,862

(22) Filed: Jul. 7, 2016

(51) Int. Cl.
 *G06K 9/00* (2006.01)
 *G06K 9/46* (2006.01)
 *G06K 9/62* (2006.01)

(52) U.S. Cl.
 CPC ..... *G06K 9/00765* (2013.01); *G06K 9/00664* (2013.01); *G06K 9/00718* (2013.01); *G06K 9/4676* (2013.01); *G06K 9/6259* (2013.01)

(58) Field of Classification Search
 CPC ............ G06K 9/6267; G06K 9/00335; G06K 9/00765; G06K 9/00664; G06K 9/00718; G06K 9/4676; G06K 9/6259; G06T 2207/30232; G06T 7/215
 USPC ........................................ 382/159, 173, 180
 See application file for complete search history.

(56) References Cited

U.S. PATENT DOCUMENTS

| 7,200,266 B2 * | 4/2007 | Ozer ................. G06K 9/00335 382/100 |
| 9,594,963 B2 * | 3/2017 | Bobbitt .............. G06K 9/00718 |
| 2010/0011297 A1 * | 1/2010 | Tsai .................. G06F 17/30843 715/721 |
| 2014/0184384 A1 | 7/2014 | Zhu et al. |
| 2014/0270707 A1 | 9/2014 | Fathi et al. |

FOREIGN PATENT DOCUMENTS

| WO | WO 2013/075002 A1 | 5/2013 |
| WO | WO 2014/110469 A1 | 7/2014 |

* cited by examiner

*Primary Examiner* — Daniel Mariam
(74) *Attorney, Agent, or Firm* — LeonardPatel PC

(57) ABSTRACT

Embodiments disclose methods, systems and non-transitory computer readable medium for joint temporal segmentation and classification of user activities in an egocentric video. The method includes extracting low-level features from a live dataset based on predefined feature categories; determining at least one activity change frame from the egocentric video frames based on the extracted features; dividing the live dataset into partitions based on the activity change frame, each partition begins with a candidate frame; computing a recursive cost function at the candidate frame of each partition based on dynamic programming; determining a beginning time instant of the candidate frame based on the computation; segmenting the live dataset into multiple segments based on the determined time instant; identifying at least one activity segment that corresponds a user activity using a trained activity model based on multiple instance learning approach; and simultaneously associating a predefined activity label with the identified activity segment.

18 Claims, 12 Drawing Sheets

400

| LABEL CATEGORY | MEAN OF LENGTH (SECS) |
|---|---|
| COMBING HAIR | 26.50 |
| MAKE UP | 108.00 |
| BRUSHING TEETH | 128.86 |
| DENTAL FLOSS | 92.00 |
| WASHING HANDS/FACE | 76.00 |
| DRYING HANDS/FACE | 26.67 |
| LAUNDRY | 215.50 |
| WASHING DISHES | 159.60 |
| MOVING DISHES | 143.00 |
| MAKING TEA | 143.00 |
| MAKING COFFEE | 85.33 |
| DRINKING WATER/BOTTLE | 70.50 |
| DRINKING WATER/TAP | 8.00 |
| MAKING COLD FOOD/SNACK | 117.20 |
| VACUUMING | 77.00 |
| WATCHING TV | 189.60 |
| USING COMPUTER | 105.60 |
| USING CELL | 18.67 |

FIG. 4

|  | WINDOW-BASED | DP+miSVM |
| --- | --- | --- |
| WITHOUT NULL CLASS | 24.45% | 51.21% |
| WITH NULL CLASS | 16.02% | 34.24% |

FIG. 7A

JOINT TEMPORAL SEGMENTATION AND CLASSIFICATION OF USER ACTIVITIES IN EGOCENTRIC VIDEOS

TECHNICAL FIELD

The presently disclosed embodiments relate to optimization-based supervised machine learning, and more particularly to joint temporal segmentation and classification of activities in egocentric videos.

BACKGROUND

Wearable technology is on the rise for both business and personal use. Various wearable devices such as intelligent eyewear, smart watches, and hi-tech clothing have found applications in various domains including those related to medical, gaming, industrial, fitness and lifestyle. This has allowed for ubiquitous computing through wearable sensing over the last decade. One of the most common applications of wearable sensing is to capture an egocentric video using an egocentric camera for analysis. The egocentric video provides a first-person view of events depicted by video sequences.

The egocentric video is typically a combination of relevant and non-relevant video segments based on an intended application. For example, police officers can wear egocentric cameras to record interactions with defaulters (e.g., drunk drivers) and also, ambient surroundings for additional cues. Therefore, it is critical to automatically analyze the relevant video segments (e.g., misdemeanour by a defaulter) while ignoring the non-relevant video segments (e.g., walking towards the car, drinking coffee, etc.) for efficient insights during jurisdiction. Similarly, egocentric video analysis may be performed to improve education and cognitive healthcare.

One conventional approach for the automatic analysis of egocentric videos involves patterns of attention and social interactions being identified as relevant video segments based on a combination of audio and visual (AV) cues in the egocentric videos. However, use of such AV combination cannot be generalized to identify a relevant video segment in case of multiple activities being performed simultaneously. For example, the AV approach cannot correctly identify different food preparations as the relevant video segments when a user is cooking while speaking on a phone. Another approach identifies the relevant video segments through classification of pre-segmented activities in the egocentric video. However, it essentially requires all video segments to be processed individually, thereby increasing the computational complexity.

Further, the traditional approaches typically analyze the behavior of objects or persons in an egocentric video. However, they do not focus on the activities performed by a user who is wearing the camera to capture the egocentric video. As a result, the user behavior is not analyzed effectively.

Therefore, there exists a need for a computationally efficient method that reliably performs activity analysis of users in an egocentric video.

SUMMARY

One exemplary embodiment of the present disclosure discloses a computer-implemented method for joint temporal segmentation and classification of user activities in an egocentric video. The method includes receiving, using a data input module on a computer with a processor and a memory, a live dataset including an egocentric video including at least one egocentric video sequence having a plurality of egocentric video frames; extracting, using a feature extraction module on the computer in communication with a joint segmentation and classification (JSC) module on the computer, a plurality of low-level features from the live dataset based on predefined feature categories; determining, using the JSC module on the computer, at least one activity change frame from the plurality of egocentric video frames based on the extracted plurality of low-level features; dividing, using the JSC module on the computer, the live dataset into a plurality of partitions based on the determined at least one activity change frame, wherein each of the plurality of partitions begins with a candidate video frame; computing, using the JSC module on the computer, a recursive cost function at the candidate video frame of each of the plurality of partitions based on dynamic programming; determining, using the JSC module on the computer, a beginning time instant of the candidate frame based on the computation; segmenting, using the JSC module on the computer, the live dataset into a plurality of segments based on the determined beginning time instant; identifying, using the JSC module on the computer, at least one activity segment that corresponds to at least one user activity among the plurality of segments using a predefined activity model being trained based on a multiple instance learning (MIL) based classifier; associating, using the JSC module on the computer, a predefined activity label with the identified at least one activity segment; and outputting, using the computer, the live dataset assigned with the predefined activity label for the at least one activity segment.

Another exemplary embodiment of the present disclosure discloses a system for joint temporal segmentation and classification of at least one user activity in an egocentric video. The system includes a data input module, a feature extraction module, and a joint segmentation and classification (JSC) module, which are on a computer with a processor and a memory. The data input module on the computer is configured to receive a live dataset including at least one egocentric video sequence having a plurality of egocentric video frames. The feature extraction module on the computer is configured to extract a plurality of low-level features from the live dataset based on predefined feature categories. The JSC module on the computer is configured to: determine at least one activity change frame from the plurality of egocentric video frames based on the extracted plurality of low-level features; divide the live dataset into a plurality of partitions based on the determined at least one activity change frame, wherein each of the plurality of partitions begins with a candidate video frame; compute a recursive cost function at the candidate video frame of each of the plurality of partitions based on dynamic programming; determine a beginning time instant of the candidate frame based on the computation; segment the live dataset into a plurality of segments based on the determined beginning time instant; identify at least one activity segment that corresponds to at least one user activity among the plurality of segments using a predefined activity model being trained based on a multiple instance learning (MIL) based classifier; and associate a predefined activity label with the identified at least one activity segment, wherein the computer is configured to output the live dataset assigned with the predefined activity label for the at least one activity segment.

Yet another exemplary embodiment of the present disclosure discloses a non-transitory computer-readable medium comprising computer-executable instructions for joint temporal segmentation and classification of at least one user activity in an egocentric video. The non-transitory computer-readable medium comprises instructions for receiving a live dataset including an egocentric video including at least one egocentric video sequence having a plurality of egocentric video frames; extracting a plurality of low-level features from the live dataset based on predefined feature categories; determining at least one activity change frame from the plurality of egocentric video frames based on the extracted plurality of low-level features; dividing the live dataset into a plurality of partitions based on the determined at least one activity change frame, wherein each of the plurality of partitions begins with a candidate video frame; computing a recursive cost function at the candidate video frame of each of the plurality of partitions based on dynamic programming; determining a beginning time instant of the candidate frame based on the computation; segmenting the live dataset into a plurality of segments based on the determined beginning time instant; identifying at least one activity segment that corresponds to at least one user activity among the plurality of segments using a predefined activity model being trained based on a multiple instance learning (MIL) based classifier; simultaneously associating a predefined activity label with the identified at least one activity segment; and outputting the live dataset assigned with the predefined activity label for the at least one activity segment.

Other and further aspects and features of the disclosure will be evident from reading the following detailed description of the embodiments, which are intended to illustrate, not limit, the present disclosure.

BRIEF DESCRIPTION OF THE DRAWINGS

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

FIG. 4 is a table illustrating labels for the egocentric video of FIG. 3, according to an embodiment of the present disclosure.

FIG. 7A is a table that illustrates a comparison between the joint activity segmentation and classification method implemented by the activity analysis device of FIG. 1A and the conventional sliding window-based classification method, according to an embodiment of the present disclosure.

DETAILED DESCRIPTION

Figure 1A:
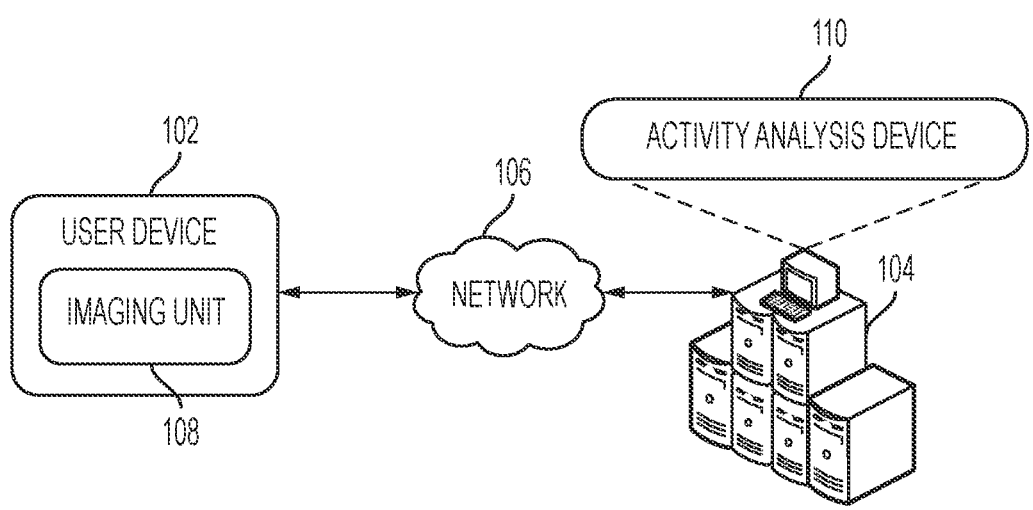
FIGS. 1A-1D are schematics that illustrate network environments including an exemplary activity analysis device, according to an embodiment of the present disclosure.

The following detailed description is made with reference to the figures. Some of the embodiments are described to illustrate the disclosure, not to limit its scope, which is defined by the claims. Those of ordinary skill in the art will recognize a number of equivalent variations in the description that follows.

Non-Limiting Definitions

Definitions of one or more terms that will be used in this disclosure are described below without limitations. For a person skilled in the art, it is understood that the definitions are provided just for the sake of clarity, and are intended to include more examples than just provided below.

An "egocentric video" is used in the present disclosure in the context of its broadest definition. The egocentric video may refer to a video in which events (e.g., activities, surroundings, interactions, conversations, objects, movements, etc.) are depicted in a first-person-view.

An "egocentric user" is used in the present disclosure in the context of its broadest definition. The egocentric user may refer to a user whose first-person-view is used to capture or record the egocentric video. This may simple be referred to as a user.

A "task" is used in the present disclosure in the context of its broadest definition. The task may refer to an operation to be performed on a dataset. The task may be associated with at least one primary label sequence and may optionally include one or more secondary label sequences. In some examples, the task may correspond to a problem to be resolved such as, but not limited to, determining an activity performed by the egocentric user.

A "training dataset" is used in the present disclosure in the context of its broadest definition. The training dataset may refer to at least a portion of the egocentric video.

A "feature" or "feature vector" is used in the present disclosure in the context of its broadest definition. The feature may refer to a property of an entity such as a person or an object. Examples of the property may include, but not limited to, body contour of a person, shape or color of the object, and so on.

A "model" or "equation" is used in the present disclosure in the context of its broadest definition. The model may refer to a mathematical representation of the task involving one or more parameters, each of which may correspond to the feature.

Overview

Various embodiments of the present disclosure describe systems and methods for joint temporal segmentation and classification of various activities (e.g., activities of daily living) in an egocentric video. The embodiments include an activity analysis device that implements a novel multiple instance learning (MIL) based framework to learn egocentric activity models that do not have distractors and contain only the actions that are consistent with predefined true activity class or labels. The framework implements a systematic approach that cyclically allows estimated activity labels to influence the accuracy of activity-based video segmentation and estimated segment boundaries that in turn influence the association of activity labels. The activity analysis device optimally segments the egocentric video into multiple video segments based on a segmentation cost function being optimized using dynamic programming. Once the egocentric video is segmented, the activity analysis device identifies video segments that correspond to the user activities of a true activity class (also, referred to as activity segments) using a predefined activity model being trained based on the MIL approach. As a result, those video segments that do not belong to the true activity class (also, referred to as distractors) are removed, thereby reducing the computational complexity while improving the segmentation accuracy. The activity segments are then labeled with a predefined activity class by the activity analysis device.

Exemplary Embodiments

FIG. 1A is a schematic that illustrates a first network environment including an exemplary activity analysis device, according to an embodiment of the present disclosure. Embodiments may be applied in the context of household activities of everyday living (ADL), hereinafter referred to as activities, performed by a user. However, other embodiments may be applied in the context of business, social, and personal scenarios involving interaction between a user and other entities including people, objects, artificial intelligence system, or a combination thereof. Examples of such scenarios include, but are not limited to, police officers interacting with criminals or inspecting a crime scene, a patient suffering from Alzheimer's disease performing his everyday activities, a student attending school, etc.

The first network environment may include a user device 102 in communication with a server 104 over a network 106. The network 106 may include, for example, one or more of the Internet, Wide Area Networks (WANs), Local Area Networks (LANs), analog or digital wired and wireless telephone networks (e.g., a PSTN, Integrated Services Digital Network (ISDN), a cellular network, and Digital Subscriber Line (xDSL)), radio, television, cable, satellite, and/or any other delivery or tunneling mechanism for carrying data. The network 106 may include multiple networks or sub-networks, each of which may include, for example, a wired or wireless data pathway. The network 106 may include a circuit-switched voice network, a packet-switched data network, or any other network able to carry video data. For example, the network 106 may include networks based on the Internet protocol (IP) or asynchronous transfer mode (ATM), and may support voice using, for example, VoIP, Voice-over-ATM, or other comparable protocols used for voice, video, and data communications.

The user device 102 may include any of a variety of computing devices, including, for example, a server, a desktop PC, a notebook, a workstation, a personal digital assistant (PDA), a mainframe computer, a mobile computing device, an internet appliance, and so on. In one embodiment, the user device 102 may be implemented as a suitable wearable device known in the art, related art, or developed later (e.g., a body gear, a body clothing, a fashion jewelry, etc.) in communication with an imaging unit 108. The user device 102 may be worn or held by a user for the imaging unit 108 to record an egocentric video, which may be stored on the user device 102 or an external data storage unit (not shown).

The user device 102 may communicate the captured or recorded egocentric video to the server 104 over the network 106. The server 104 may be implemented as any of a variety of computing devices including, for example, a general purpose computing device, multiple networked servers (arranged in clusters or as a server farm), a mainframe, or so forth. In some embodiments, the server 104 may store the received egocentric video in its data repository (not shown).

In a first embodiment (FIG. 1A), the server 104 may be installed, integrated, or operated with an activity analysis device 110 configured to receive the egocentric video from the user device 102. The activity analysis device 110 may be configured to at least one of: (1) communicate synchronously or asynchronously with one or more software applications, databases, storage devices, or appliances operating via same or different communication protocols, formats, database schemas, platforms or any combination thereof, to receive video data; (2) collect, record, and analyze data including the egocentric video; (3) formulate one or more tasks (e.g., joint segmentation and classification of activities, determining MIL-based activity model, etc.) for being trained from the data or datasets such as an egocentric video dataset; (4) provide, execute, communicate, assist in formulating one or more mathematical models for tasks related to joint temporal segmentation and classification of activities performed from a first-person-view by a user (hereinafter interchangeably referred to as egocentric activities) in an egocentric video; (5) train an activity model using the egocentric activities based on MIL-based approach; (6) jointly segment and classify the egocentric activities based on dynamic programming and the trained activity model; (7) determine the temporal extent of each egocentric activity using a segmentation cost function being optimized based on dynamic programming and simultaneously label an egocentric activity with a predefined activity class or label; (8) assign at least one label to the egocentric activities based on the trained model(s); and (9) transfer or map the model(s), tasks, shared parameter, labeled data or datasets, or any combination thereof to one or more networked computing devices and/or data repositories.

The activity analysis device 110 may represent any of a wide variety of devices capable of providing joint image segmentation and classification services to the network devices. Alternatively, the activity analysis device 110 may be implemented as a software application or a device driver. The activity analysis device 110 may enhance or increase the functionality and/or capacity of the network, such as the network 106, to which it is connected. In some embodiments, the activity analysis device 110 may be also configured, for example, to perform e-mail tasks, security tasks, network management tasks including Internet protocol (IP) address management, and other tasks. In some other embodiments, the activity analysis device 110 may be further configured to expose its computing environment or operating code to a user, and may include related art I/O devices, such as a keyboard or display. The activity analysis device 110 of some embodiments may, however, include software, firmware, or other resources that support the remote administration and/or maintenance of the activity analysis device 110.

In further embodiments, the activity analysis device 110 either in communication with any of the networked devices such as the user device 102, or independently, may have video along with voice or data communication capabilities (e.g., unified communication capabilities) by being coupled to or including, various imaging devices (e.g., cameras, printers, scanners, medical imaging systems, etc.), various audio devices (e.g., microphones, music players, recorders, audio input devices, speakers, audio output devices, telephones, speaker telephones, etc.), various video devices (e.g., monitors, projectors, displays, televisions, video output devices, video input devices, camcorders, etc.), or any other type of hardware, in any combination thereof. In some embodiments, the activity analysis device 110 may comprise or implement one or more real time protocols (e.g., session initiation protocol (SIP), H.261, H.263, H.264, H.323, etc.) and non-real-time protocols known in the art, related art, or developed later to facilitate data transfer between the user device 102, the imaging unit 108, the server 104, the activity analysis device 110, and any other network device.

In some embodiments, the activity analysis device 110 may be configured to convert communications, which may include instructions, queries, data, etc., from the user device 102 into appropriate formats to make these communications compatible with the server 104, and vice versa. Consequently, the activity analysis device 110 may allow implementation of the user device 102 using different technologies or by different organizations, for example, a third-party vendor, managing the server 104 or associated services using a proprietary technology.

Figure 1B:
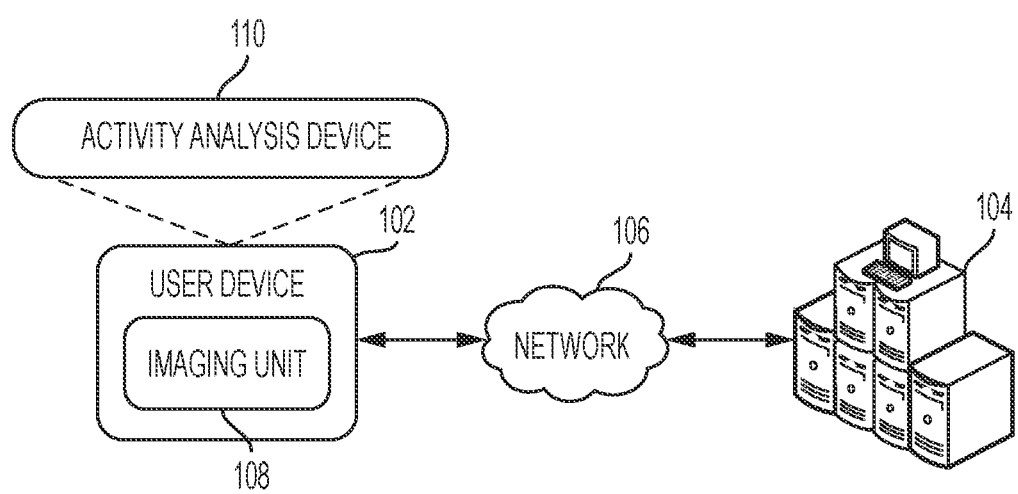
Figure 1C:
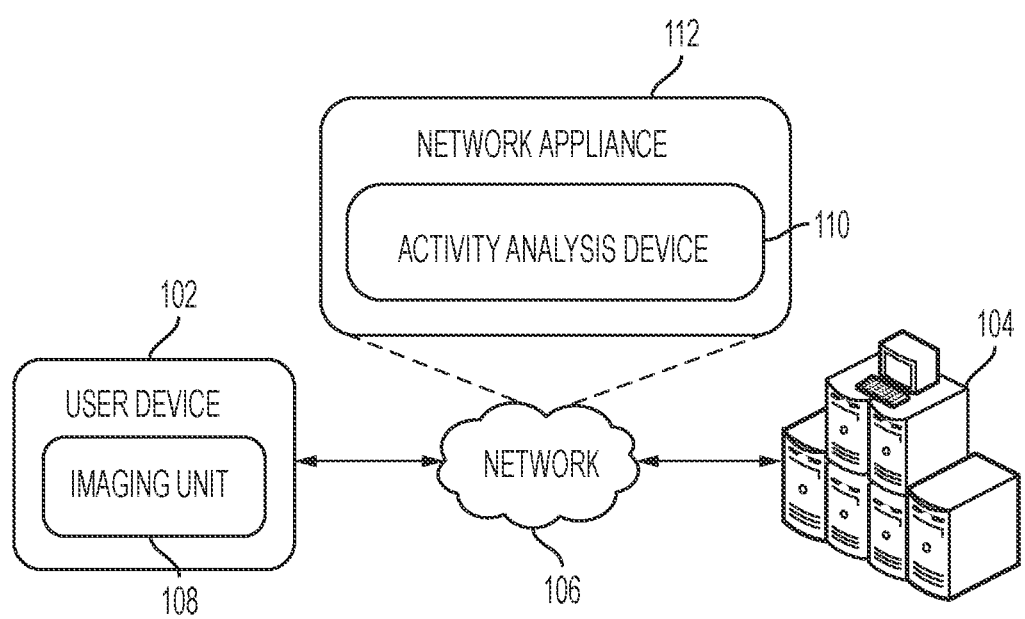

In a second embodiment (FIG. 1B), the activity analysis device 110 may be integrated, installed, or operated with the user device 102. In a third embodiment (FIG. 1C), the activity analysis device 110 may be installed on or integrated with a network appliance 112 configured to establish the network 106 between the user device 102 and the server 104. One of the activity analysis device 110 and the network appliance 112 may be capable of operating as or providing an interface to assist the exchange of software instructions and data among the user device 102, the server 104, and the activity analysis device 110. In some embodiments, the network appliance 112 may be preconfigured or dynamically configured to include the activity analysis device 110 integrated with other devices. For example, the activity analysis device 110 may be integrated with the server 104 (as shown in FIG. 1A) or any other computing device (not shown) connected to the network. The server 104 may include a module (not shown), which enables the server 104 being introduced to the network appliance 112, thereby enabling the network appliance 112 to invoke the activity analysis device 110 as a service. Examples of the network appliance 112 include, but are not limited to, a DSL modem, a wireless access point, a router, a base station, and a gateway having a predetermined computing power and memory capacity sufficient for implementing the activity analysis device 110.

Figure 1D:
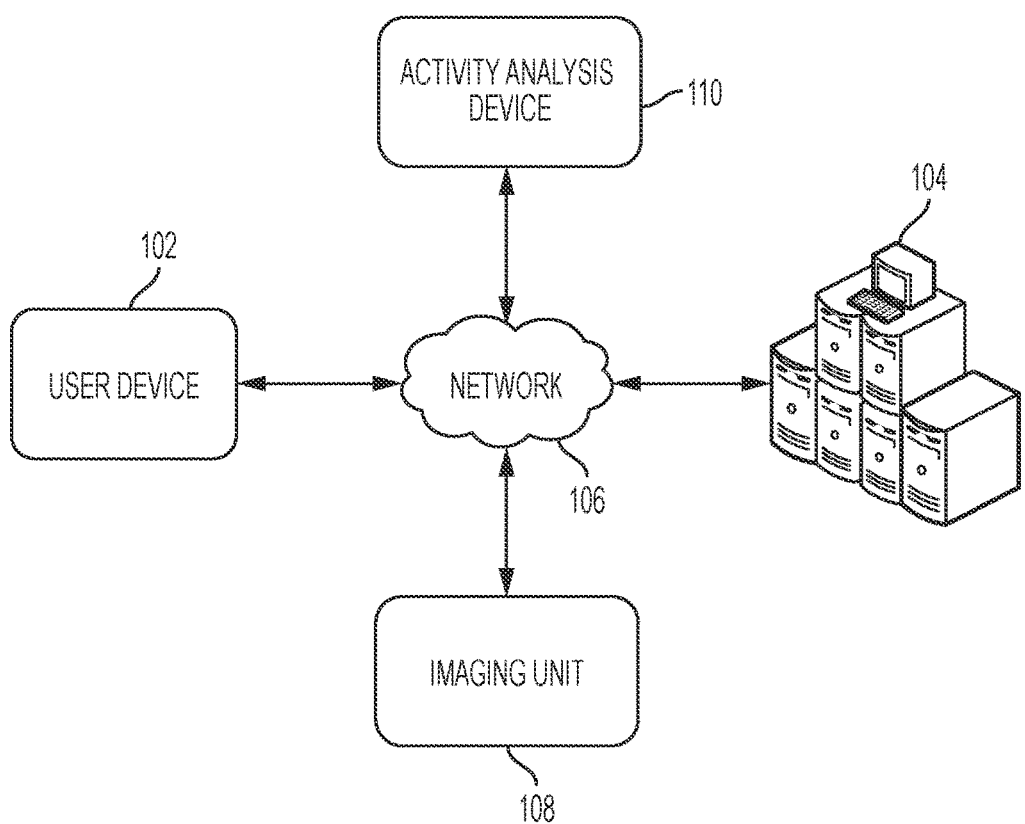

In a fourth embodiment (FIG. 1D), the imaging unit 108 may be a standalone device, which is separate from the user device 102. The imaging unit 108 may include its own processor (not shown) and a transmitter and receiver (TxRx) unit (not shown). In this embodiment, the imaging unit 108, the user device 102, the server 104, and the activity analysis device 110 may be implemented as dedicated devices communicating with each other over the network 106. Accordingly, the imaging unit 108 may be configured as a wearable or portable device and can be held or worn respectively by the user for capturing an egocentric video, which may be directly communicated to the activity analysis device 110 using the TxRx unit.

Figure 2:
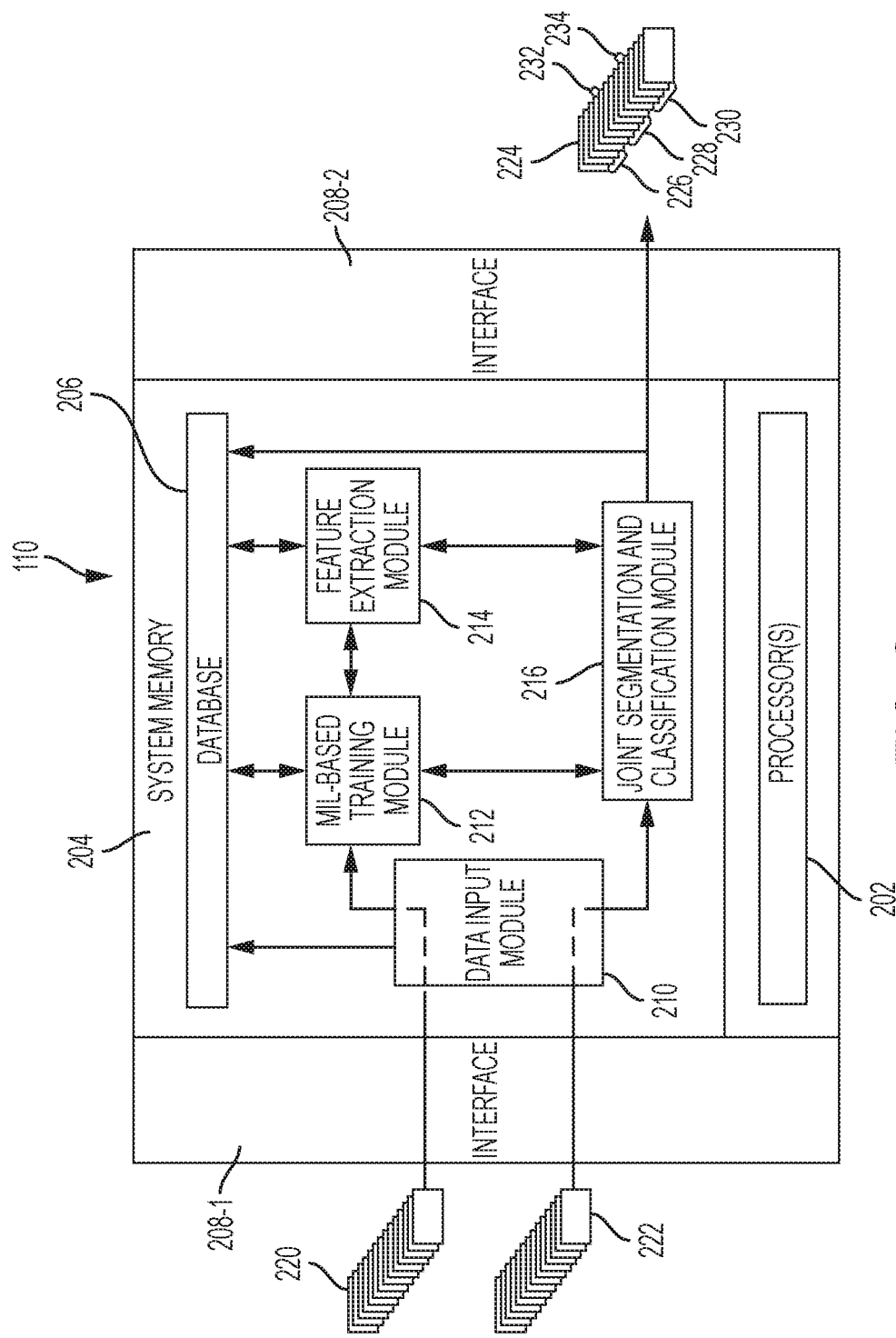
FIG. 2 is a workflow diagram of the activity analysis device of FIG. 1A, according to an embodiment of the present disclosure.

Further, as illustrated in FIG. 2, the activity analysis device 110 may be implemented by way of a single device (e.g., a computing device, a processor or an electronic storage device) or a combination of multiple devices that are operatively connected or networked together. The activity analysis device 110 may be implemented in hardware or a suitable combination of hardware and software. In some embodiments, the activity analysis device 110 may be a hardware device including processor(s) 202 executing machine readable program instructions to (1) analyze the egocentric video, (2) perform predefined supervised machine learning tasks, and (3) jointly segment and classify only the relevant activities in the egocentric video. The "hardware" may comprise a combination of discrete components, an integrated circuit, an application-specific integrated circuit, a field programmable gate array, a digital signal processor, or other suitable hardware. The "software" may comprise one or more objects, agents, threads, lines of code, subroutines, separate software applications, two or more lines of code or other suitable software structures operating in one or more software applications or on one or more processors. The processor(s) 202 may include, for example, microprocessors, microcomputers, microcontrollers, digital signal processors, central processing units, state machines, logic circuits, and/or any devices that manipulate signals based on operational instructions. Among other capabilities, the processor(s) 202 may be configured to fetch and execute computer-readable instructions in a memory 204 associated with the activity analysis device 110 for performing tasks such as signal coding, data processing input/output processing, power control, and/or other functions.

In some embodiments, the activity analysis device 110 may include, in whole or in part, a software application working alone or in conjunction with one or more hardware resources. Such software application may be executed by the processor(s) 202 on different hardware platforms or emulated in a virtual environment. Aspects of the activity analysis device 110 may leverage known, related art, or later developed off-the-shelf software. Other embodiments may comprise the activity analysis device 110 being integrated or in communication with a mobile switching center, network gateway system, Internet access node, application server, IMS core, service node, or some other communication systems, including any combination thereof. In some embodiments, the activity analysis device 110 may be integrated with or implemented as a wearable device including, but not limited to, a fashion accessory (e.g., a wristband, a ring, etc.), a utility device (a hand-held baton, a pen, an umbrella, a watch, etc.), a body clothing, or any combination thereof.

The activity analysis device 110 may also include a variety of known, related art, or later developed interfaces such as interfaces 208-1 and 208-2 (collectively, referred to as interfaces 208), including software interfaces (e.g., an application programming interface, a graphical user interface, etc.); hardware interfaces (e.g., cable connectors, a keyboard, a card reader, a barcode reader, a biometric scanner, an interactive display screen, a video transmitter circuit, a video receiver circuit, etc.); or both.

The activity analysis device 110 may further include a system memory 204 for storing, at least, one of (1) files and related data including metadata, e.g., data size, data format, creation date, associated tags or labels, related videos, images, documents, messages or conversations, etc.; (2) a log of profiles of network devices and associated communications including instructions, queries, conversations, data, and related metadata; (3) predefined or dynamically defined or calculated mathematical models or equations, and parameter values; and (4) predefined labels or classes.

The system memory 204 may comprise of any computer-readable medium known in the art, related art, or developed later including, for example, a processor or multiple processors operatively connected together, volatile memory (e.g., RAM), non-volatile memory (e.g., flash, etc.), disk drive, etc., or any combination thereof. The system memory 204 may include one or more databases such as a database 206, which may be sub-divided into further databases for storing electronic files. The system memory 204 may have one of many database schemas known in the art, related art, or developed later for storing egocentric video data, predefined or dynamically defined models, and parameter values. For example, the database 206 may have a relational database schema involving a primary key attribute and one or more secondary attributes. In some embodiments, the activity analysis device 110 may perform one or more operations including, but not limited to, reading, writing, deleting, indexing, segmenting, labeling, updating, and modifying the data, or a combination thereof, and may communicate the resultant data to various networked computing devices.

In one embodiment, the system memory 204 may include various modules such as a data input module 210, a feature extraction module 214, an MIL-based training module 212, and a joint segmentation and classification (JSC) module 216. The data input module 210 may receive an egocentric video from the user device 102, the imaging unit 108, the server 104, or any combination thereof. In one embodiment, the data input module 210 may be preconfigured or dynamically configured to use the complete received egocentric video or a portion thereof as a training dataset 220. For example, the data input module 210 may receive an egocentric video, which may be a compendium of 20 sub-videos, each corresponding to a person performing a predefined set of 18 daily living activities at a respective location. Some example activities may include, but not limited to, 'washing hands/face,' 'combing hair,' 'brushing teeth,' 'laundry,' 'vacuuming,' etc. The sub-videos may be captured using the imaging unit 108 such as a chest-mounted camera and may be 30 minutes long on average. The activities may be performed in different order by the user. The sub-videos may be captured in unconstrained settings, for example, varying surroundings, lighting, object appearance, etc., which complicate a task of classifying or segmenting the activities.

In said embodiment, the data input module 210 may be preconfigured or dynamically configured to transmit the egocentric video in parts to other interconnected modules. For example, the data input module 210 may divide the egocentric video and may define 19 sub-videos as a training dataset, in which the first 6 sub-videos may be used to train part-based a visual object detector(s) (e.g., MIL-based training module 212) to determine object features and a motion codebook for motion features. The remaining 13 sub-videos may be used in a leave-one-out fashion to compute the segmentation and classification accuracies for training a predefined activity model, discussed below in greater detail. The remaining one sub-video in the egocentric video may be defined as a testing dataset, which may be used by the JSC module 216 to evaluate the activity model being trained by the MIL-based training module 212. In some embodiments, the data input module 210 may be supplied with two different sets of egocentric videos to be used as a training dataset 220 and a testing dataset 222.

Figure 3:
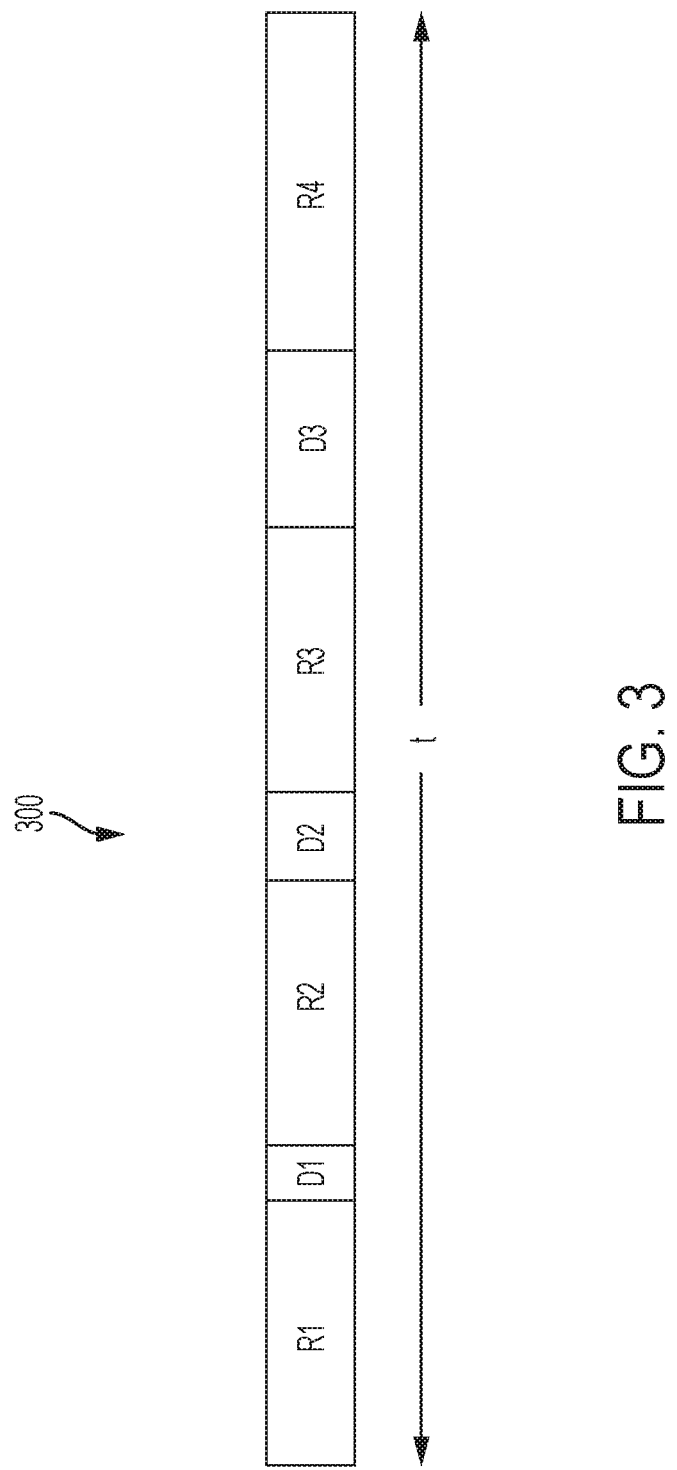
FIG. 3 is a typical egocentric video to be processed by the activity analysis device of FIG. 2, according to an embodiment of the present disclosure.

An egocentric video may include relevant video segments and non-relevant video segments, which are hereinafter referred to as distractors. For example, as shown in FIG. 3, an egocentric video 300 having a time duration 't' may comprise relevant video segments R1, R2, R3, and R4 (collectively, R), and distractors D1, D2, and D3 (collectively, D). Each of the relevant video segments R and the distractors D may include one or more video sequences or frames. Each relevant video segment may refer to a portion of the egocentric video that may depict the user performing an actual activity from a first-person-view. A user activity or action may be referred to as an actual activity if it related to a predefined class or label based on low-level object features and motion pattern from the first-person-view in that portion. Similarly, each distractor may refer to an egocentric video portion that depicts the user performing an action or activity from the first-person-view that is not related to the predefined activity class. In a real-life example, the user may perform multiple activities such as 'speaking on phone' while 'watching TV' and simultaneously multiple irrelevant actions such as strolling back and forth from the living room to the kitchen. In the egocentric video capturing these overlapping different actions, the 'strolling back and forth' action may act as distractor as compared to the 'speaking on phone' action, which may be defined as an actual activity. As time instances of occurrence and durations of the distractors are unknown, these distractors may adversely affect the temporal consistency of an activity and therefore, make identification of the actual activity difficult.

In the training dataset 220, each video frame of the egocentric video may be pre-labeled based on low-level features including object-based features and motion boundary histograms (MBHs) as determined using any suitable feature extraction technique known in the art, related art, or developed later including the deformable parts model. The object-based features may allow identifying the ambient surroundings in the video frame, where each object may be considered as 'Active' or 'Passive' depending upon its usage. For example, an object may be considered as 'Active' if it is currently being handled or interacted with by the user from the first-person-view. Otherwise, an object may be considered as 'Passive.' The object being marked as 'Active' or 'Passive' may assist in determining a possible action being performed by the user. For example, a 'phone' and a 'TV' may be identified to be present in a video frame. In such scenario, a 'phone' being marked as 'Active' whereas 'TV' being marked as 'Passive' is highly likely to indicate 'using phone' action as compared to 'watch TV' action, though 'TV' is also present in the frame. Further, the motion boundary histograms may describe (1) shapes and respective locations of static objects when the imaging unit 108 is moving, and (2) shapes and respective locations of moving objects when the imaging unit 108 is static. These histograms may be implemented as known in the art to determine MBH features, which are defined over motion boundary images and encode the shape information with respect to hands of the user and the objects in contact with the hands. Such encoding of shape information in each video frame prunes body-related motion information and uniquely defines an activity motion with respect to the object-based features.

Further in the training dataset 220, each video frame may be pre-segmented based on a predefined label or class such as those shown in FIG. 4, which is a table 400 that illustrates exemplary labels associated with a mean duration of the corresponding activities in the training dataset 220. These labels or classes, namely, "Combing hair," "Make-up," "Brushing Teeth," "Washing hands/face," "Laundry," "Washing dishes," "Moving dishes," "Making tea/coffee," "Vacuuming," "Watching TV," "Using computer," "Using cell," etc., are mentioned under a column "label category" and durations of the respective activities are mentioned under a column "mean of length (secs)" in table 400. One having ordinary skill in the art will understand that these labels are only exemplary and a larger list of words for desired activity identification in the real-world may be defined and saved in such table 400. Table 400 may be stored in the database 206 for use by various modules of the activity analysis device 110 or other networked devices.

Since the egocentric sub-videos received as the training dataset 220 may include one or more distractors, the inherent video frames may be said to be weakly labeled. The training dataset 220 may be communicated to the MIL-based training module 212 by the data input module 210 for removal of these distractors.

The MIL-based training module 212, hereinafter referred to as training module 212, may receive the training dataset 220 from the data input module 210. The training module 212 may be preconfigured or dynamically configured to consider a label as being associated with a bag of data instead of individual data in the training dataset 220. Accordingly, the training dataset 220 may be referred as a set of labeled bags, where each egocentric activity may be represented as a bag, which may correspond to an egocentric activity sequence including multiple instances, i.e., video frames.

In one embodiment, the training module 212 may be further preconfigured or dynamically configured to determine an activity model that identifies the actual activities in the training dataset 220 and assist in removing the distractors. The activity model may be determined based on one or more bags, each with at least one of the instances that represents a true activity class, i.e., contains only the actions related to the predefined activity class or label.

Figure 5:
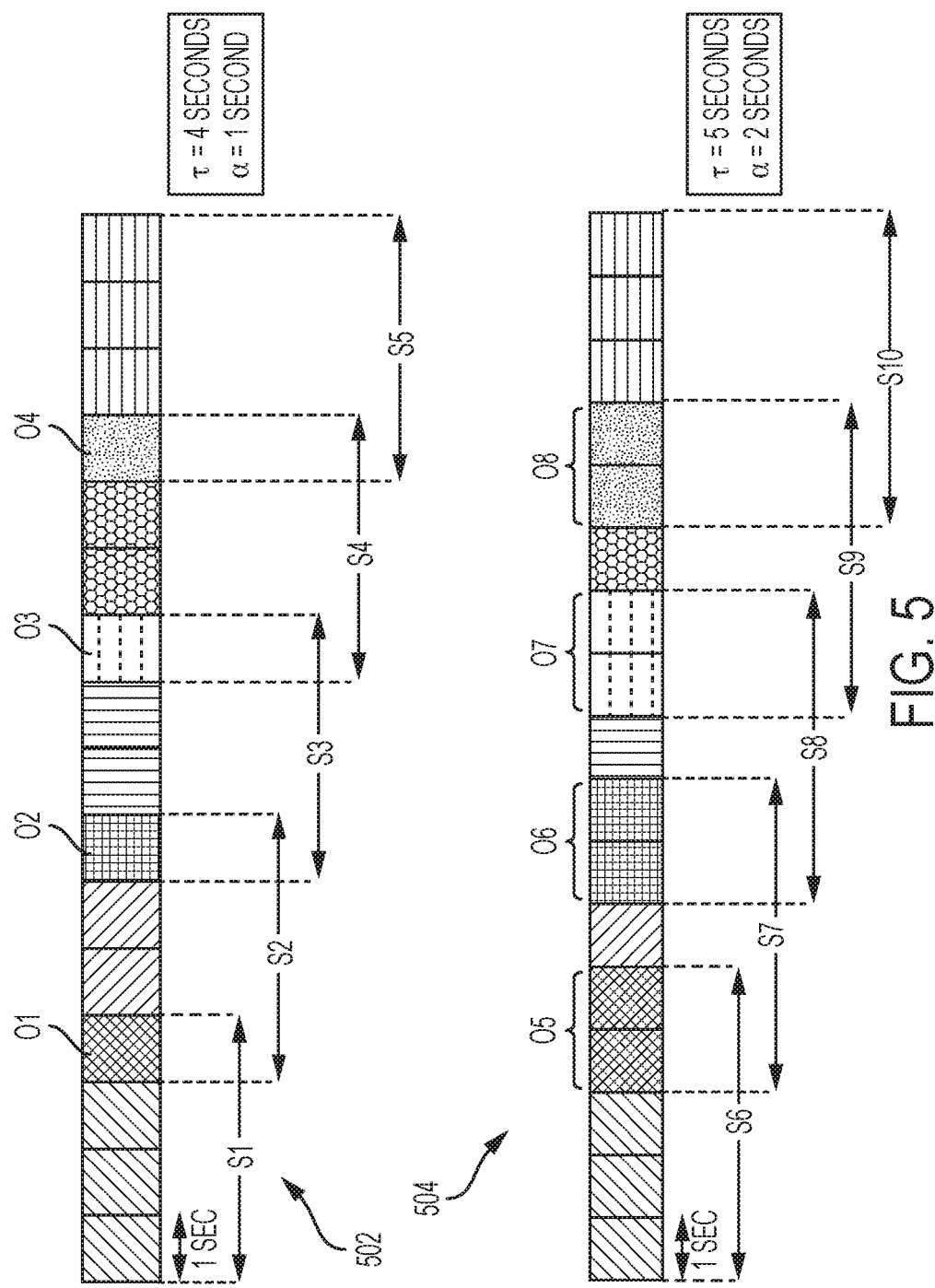
FIG. 5 is a schematic that illustrates exemplary partitioning of the egocentric video of FIG. 3 by the activity analysis device of FIG. 1A, according to an embodiment of the present disclosure.

In order to create the bags, the training module 212 may partition the received training dataset 220 into overlapping video segments of T seconds with a step size as a second. As shown in the illustrated example of FIG. 5, an egocentric video 502 may be divided into overlapping segments S1, S2, S3, S4, and S5, each being 4 seconds wide with an overlapping step size of 1 second depicted by O1, O2, O3, and O4. Similarly, another egocentric video 504 may be divided into overlapping segments S6, S7, S8, S9, and S10, each being 5 seconds wide with an overlapping step size of 2 seconds depicted by O5, O6, O7, and O8.

The training module 212 may randomly create a predefined number of subsets representing actual activities. Each subset may be a different combination of such segments based on a predefined condition that the length, i.e., time duration, of the union of all segments in that combination is not more than 50% of a mean duration of an actual activity such as those mentioned in table 400 stored in the database 206. In some embodiments, at least, one of the subsets may include only one video segment. Further, the training module 212 may store a maximum and minimum mean time durations being associated with the predefined activity class (as shown in table 400) may be stored as $t_{min}$ and $t_{max}$, respectively, in the database 206.

The predefined condition may be based on an assumption that the overall distractor length in an activity cannot be more than half of the original length of that activity because if the duration of a distractor is the majority duration of the segment, then the distractor is the true activity of the segment. In one example, the training module 212 may be configured to select 2000 combinations of subsets. These randomly selected subsets may be similar to each other as the consecutive video frames in these subsets may have high similarity and that the actual low-level features may not change drastically among many smaller frame sequences. The training module 212 may send the subsets to the feature extraction module 214 for feature extraction.

The feature extraction module 214 may extract low-level features (e.g., object-based features and MBHs) of these subsets using any suitable feature extraction method known in the art, related art, or developed later including the deformable part model. The extracted low-level features may be stored in the database 206 for use by the training module 212.

The training module 212 in communication with the database 206 may cluster the subsets into groups of KS number of instances (hereinafter referred to KS clusters) using any suitable method known in the art, related art, or developed later. In one embodiment, the training module 212 may cluster the subsets using the k-means clustering method. Centroids k of one or more of these KS clusters may collectively constitute a bag corresponding to an activity sequence that includes multiple instances or video frames. Such k centroids represent k different variants of the low-level features possible based on the subsets. In one example, the training module 212 may be set to obtain a predetermined number of varied k centroids ranging from 10 to 1000 depending on the intended complexity for accurate video classification. This bag of data comprising the centroids of the KS clusters may be communicated to the training module 212 by the feature extraction module 214.

Once such bags are created, in one embodiment, the training module 212 may be configured to learn an MIL classifier using the multiple instance learning method based on maximum-instance-margin support vector machine (SVM), i.e., mi-SVM, formulation. Accordingly, for an activity class p, let M training bags be denoted by $B_1$, $B_2$, ..., $B_I$, ..., $B_M$, where $B_I$ and its associated label $Y_I^p$ may be represented by Equations 1 and 2, respectively.

$$B\_I = \{(x\_i, y\_i)\} \quad (1)$$

where
i=1, ..., K_S instances;
x_i=instance in a bag;
y_i=instance label; and $$Y\_Ip \in \{1, -1\} \quad (2)$$

where
1=at least one instance in a bag belongs to class p
−1=no instance in a bag belongs to class p With reference to Equations 1 and 2, the training module 212 may check each bag of data (e.g., $B_1$, $B_2$, ..., etc.) for the predefined activity labels (e.g., as shown in table 400) stored in the database 206. The training module 212 may label a bag as positive, e.g., represented by an associated value of $Y_I^p$ being 1, if the bag includes at least one instance that matches the predefined activity labels (i.e., the at least one instance is positive) stored in the database 206. Similarly, the training module 212 may label a bag as negative, for example, represented by an associated value of $Y_I^p$ being −1, if all the included instances in the bag do not match the predefined activity labels (i.e., all the instances are negative) stored in the database 206. The training module 212 may calculate and assign a positive label $y_i$ having a calculated value to each instance of a bag based on Equation 3A if the label $Y_I^p$ value assigned to the bag is 1. Similarly, the training module 212 may assign a label $y_i$ having a value −1 to each instance of the bag based on Equation 3B of the label $Y_I^p$ value assigned to the bag is −1. Therefore, the information provided by the label $Y_I^p$ based on its value being 1 or −1 is asymmetric in nature such that the negative value of the bag label $Y_I^p$ induces a unique label (i.e., −1) for every instance in the bag, and the positive unity value of the bag label $Y_I^p$ does not.

$$Y_I^p = \sum_{i \in I} \frac{y_i + 1}{2} \geq 1, \forall I \text{ s.t. } Y_I^p = 1 \quad (3A)$$

$$y_i = -1, \cup I \text{ s.t. } Y_I^p = -1 \quad (3B)$$

In one embodiment, the training module 212 may implement the MIL classifier, mi-SVM, represented in Equation 4 to maximize the margin between positive and negative instance labels $y_i$ associated with the instances $x_i$ in the bags $B_M$ across a hyperplane defined by an activity model $w_p$ for class p. The margin may be defined as the smallest distance between a positive point and a negative point on this hyperplane, where these points may refer to values of the instance labels $y_i$. The points or label values that are closest to the hyperplane are called as support vectors and the corresponding instances $x_i$ define the actual activities in the training dataset 220.

$$mi - SVM = \min_{\{y_i\}} \min_{w_p, b, \xi} \frac{1}{2} \|w_p\|^2 + C \sum_i \xi_i \quad (4)$$

$$\text{s.t. } \forall I: y_i(\langle w_p, x_i \rangle + b) \geq 1 - \xi_i, \xi_i \geq 0, y_i \in \{1, -1\}$$

In Equation 4, since the labels $y_i$ represented as data points may actually not be separable even upon maximizing the margin on the hyperplane, the slack variables are included for each instance $x_i$. The slack variables allow for penalized constraint violation. Further, C is a parameter having a value that provides a trade-off between margin size and constraint violation. The value of C may be selected from a range of possible set of values using any of a variety of techniques known in the art, related art, or developed later including grid search. Further, b is an offset that is learned during the optimization procedure by the training module 212.

Furthermore, the Equation 4 shows that the instance labels $y_i$ which do not belong to any negative bag, these instance labels $y_i$ may be treated as unknown integer variables. Therefore, the training module 212 uses the MIL classifier represented by the mi-SVM formulation in Equation 4 to train a predefined activity model $w_p$ based on a margin between instance labels $y_i$ across the predefined activity model $w_p$ for identifying a true or actual activity. The training module 212 may communicate the trained activity model $w_p$ to the dynamic JSC module 216 for removing the distractors in an unseen egocentric video such as the testing dataset 222. In some embodiments, the training module 212 may itself use the activity model $w_p$ to provide distractor removal as a service to the JSC module 216 by determining the actual activities in the testing dataset 222 received from the JSC module 216 or the data input module 210.

The JSC module 216 may receive the testing dataset 222 that may be a single egocentric video, which is not pre-labeled or segmented like the training dataset 220. In some embodiments, the testing dataset 222 may be a set of multiple egocentric videos. The testing dataset 222 may include a total of N video frames, which may occur at time instants 1, 2, . . . , N, respectively.

In one embodiment, the JSC module 216 may be configured to (1) perform a joint temporal segmentation and classification of activities in an egocentric video received as the testing dataset 222, (2) determine the temporal extent of each egocentric activity based on dynamic programming, (3) partition the testing dataset 222 (or an unseen egocentric video) into a predefined K number of activity segments based on the determined temporal extent and the activity model $w_p$, (4) simultaneously assign a label to each activity segment with a predefined corresponding class, and (5) evaluate models learned, trained, or provided by the training module 212.

When a new activity in a video sequence begins, at least, one object used by a user may change. For example, when a user stops 'cooking' and starts 'washing dishes,' the user may stop using the 'oven' and may open the 'tap'. The JSC module 216 may detect object features and their respective confidence scores (i.e., a maximum value of mi-SVM of Equation 4) based on the low-level features stored in the database 206, and in some embodiments using the feature extraction module 214 employing a variety of feature extraction techniques known in the art, related art, or developed later including the deformable parts model, as discussed above, to select a possible set of activity change points.

Figure 6:
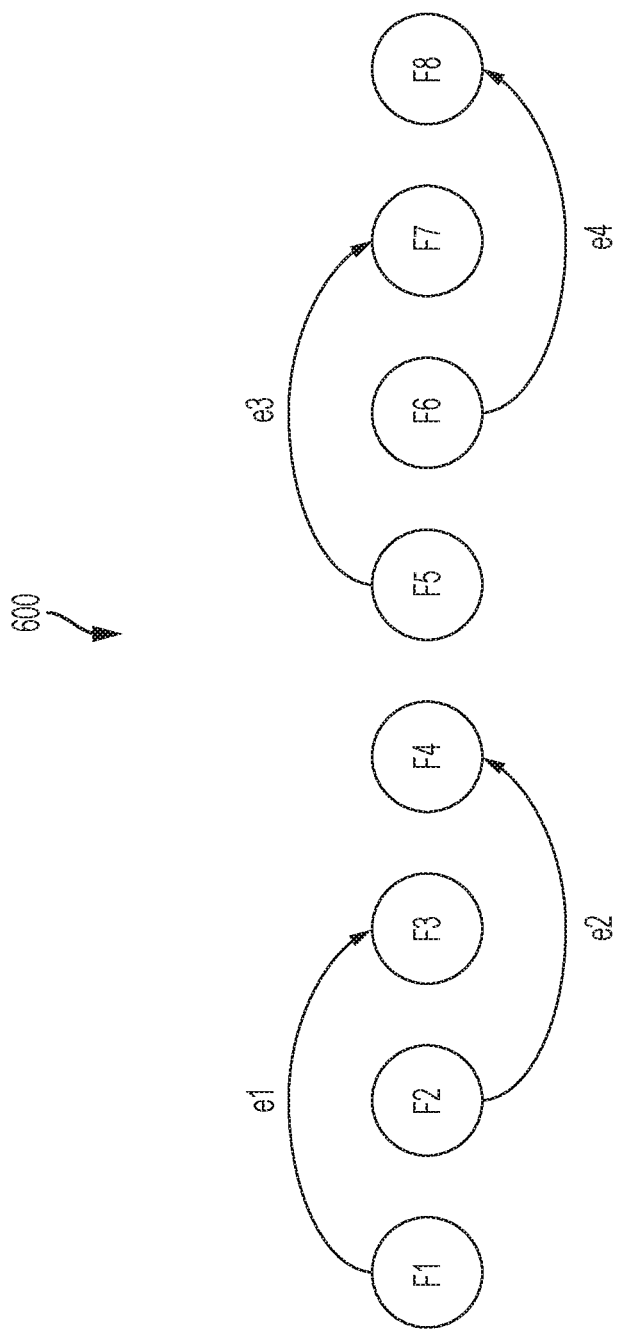
FIG. 6 is a graph illustrating video frames of an egocentric video being analyzed by the activity analysis device of FIG. 1A, according to an embodiment of the present disclosure.

In a graphical framework as illustrated in FIG. 6, video frames in the testing dataset 222 may be represented as nodes such as nodes F1, F2, . . . , F8, (collectively, referred to as nodes F) in a graph 600. The JSC module 216 may select multiple frame pairs such that each pair is a set of two nodes that are connected by an edge and separated by a predefined number of nodes (i.e., frames). For example, in the graph 600, the JSC module 216 may add an edge between two nodes, such as node pairs F1-F3, F2-F4, F5-F7, and F6-F8, which are separated by one video frame. A lesser separation increases the partitioning accuracy and a greater separation reduces the computational complexity. In one embodiment, the node pairs may be separated by maximum ten frames or nodes to achieve an optimal trade-off between the partitioning accuracy and the computation complexity. Each node in an edge-connected node pair may refer to an activity change point.

An edge weight (e.g., e1, e2, e3, or e4) between two nodes i and j in a node pair (e.g., referring to the node pair F1-F3) may be computed as $e(i,j) = \Sigma_q O_i^q \cdot O_j^q$, where q may denote all the objects which may be common between the frames i and j and $O_i^q$ may denote the confidence of the qth object in the ith frame. Similarly, $O_j^q$ may denote the confidence of the qth object in the jth frame. Such weighted graph may be partitioned into $K_C$ segments using any of a variety of graph cut techniques known in the art, related art, or developed later. The $K_C$ segments may be divided into two groups including a first group that may have a high measure of similarity and a second group that may have a low measure of similarity. The graph-cut technique may compute the degree of dissimilarity between these two groups as the total weight of edges removed between these two groups. In one embodiment, the JSC module 216 may implement the technique of normalized graph cut to partition the weighted graph. According to this technique, the beginning frames corresponding to each of the $K_C$ segments may be used as candidate frames to segment the egocentric video V in the testing dataset 222 into K number of activity segments, each of which is a candidate frame.

Let $t_1, t_2, \ldots, t_K$ be the beginning time instant of the K activity segments, where $t_1$ may be equal to 1, i.e., $t_1 = 1$. Then, a cost function for the K activity segments may be defined as shown in Equation 6.

$$\text{Cost}(K) = \min_{K, t_k, y_k} \sum_{k=1}^{K} 1 - [f(V_{[t_k, t_{k+1}]}, y_k) - f(V_{[t_k, t_{k+1}]}, y)]_{y \neq y_k} \quad (6)$$

$$\text{s.t. } t_{min} \leq t_{k+1} - t_k \leq t_{max} \forall k$$

In Equation 6, $V_{[t_k, t_{k+1}]}$ denotes one of the K activity segments of the video V starting from the time instant $t_k$ and ending at time instant $t_{k+1}-1$, and $t_{min}$ and $t_{max}$ denote minimum and maximum duration of the K activity segments respectively. Further, $f(f_{[t_k,t_{k+1})}, y_k)$ denotes the mi-SVM score (or confidence score) of the K activity segments $V_{[t_k,t_{k+1})}$ computed 5 by the JSC module 216 with respect to activity class $y_k$. In one embodiment, the $t_{min}$ (e.g., 3 seconds) and $t_{max}$ (e.g., 400 seconds) may be retrieved from the database 206 or directly provided by the training module 212. As indicated by the summation sign ($\Sigma$) in Equation 6, the JSC module 216 may maximize the difference between the mi-SVM score (or confidence score) of the highest activity class $y_k$ and that of any other class $y \neq y_k$ to assign a class label with high confidence to each K activity segment. However, the overall cost function Cost(K) needs to be minimized for optimization.

In one embodiment, the JSC module 216 may implement the dynamic programming (DP) approach to optimize the cost function of Equation 6. This DP approach may involve the development of a recursive optimization procedure, which builds to a solution of the overall N video frames by first solving for one frame and sequentially including one frame at a time, thereby solving for such one-frame stages until the overall optimum has been found. This procedure may be based on a backward induction process, where the first frame to be analyzed is the final or last frame of the testing dataset 222 and the cost function is optimized by moving back one stage at a time until all stages or video frames are included.

According to the DP approach, all the K activity segments may comprise a total of N video frames occurring at time instants 1, 2, . . . , N, respectively. Each of the K activity segments may range from the candidate frame, as discussed above, to an nth frame. The JSC module 216 may implement Equations 7 and 8 to stage-wise optimize the cost function Cost(K) of Equation 6 at every candidate frame in the K activity segments. The optimization of Cost(K) may refer to a condition that results in relative superior performance within the context of the disclosure and is not limited to any type of mathematically-provable optimum value of any particular parameter. In one embodiment, such optimization may be performed to optimally segment the egocentric video in the testing dataset 222 by selecting the time instant $t_1$, $t_2$, . . . , $t_K$ at which the K activity segments begin. The corresponding optimized parameter values, and therefore the Cost(n), may be inferred using any of the variety of dynamic programming methods known in the art, related art, or developed later including the Bellman-Ford method.

$$Cost(n) = \min_{t_{min} \leq t \leq t_{max}} \{Cost(n-t) + \xi(n, t)\} \quad (7)$$

$$Seg(n) = \operatorname*{argmin}_{t_{min} \leq t \leq t_{max}} \{Cost(n-t) + \xi(n, t)\} \quad (8)$$

where:

$$\xi(n, t) = 1 - (f(V_{[n-t,n)}, y_1) - f(V_{[n-t,n)}, y_2)) \quad (9)$$

$$y_1 = \operatorname*{argmax}_{y} f(V_{[n-t,n)}, y)$$

$$y_2 = \operatorname*{argmax}_{y \neq y_1} f(V_{[n-t,n)}, y)$$

In Equations 7 and 8, Cost(n) may denote the cost of optimal segmentation of the egocentric video till the nth frame, and Seg(n) may denote the last partition point of the optimal segmentation till the nth frame. Further, the function of Equation 9 may be implemented to maximize the score difference between a best class assignment and a second best class assignment for a particular segment. The corresponding score(s) may be obtained using the MIL classifier, mi-SVM.

Once the dynamic programming costs are computed, it is required to backtrack along the costs to find the optimal segmentation. The Seg(n) function stores the optimal segmentation points and may be used to backtrack the starting points of K activity segments to obtain the joint segmentation and classification results. The JSC module 216 may recursively compute the Equations 7 and 8 to implement the DP approach, which allows the JSC module 216 to optimally determine the beginning time instants $t_1$, $t_2$, . . . , $t_K$ of the candidate frames, which in turn provides the beginning time instants of the K activity segments. As a result, the cost function Cost(n) may be recursively computed at the candidate frames through all the N video frames to determine Cost (N) that provides the optimal segmentation of the egocentric video V in the testing dataset 222. Advantageously, the use of only few selected frames, i.e., candidate frames reduces the worst-case computational complexity of the DP approach from $O(Nt_{max})$ to $O(K_C t_{max})$ without affecting the segmentation and classification results.

Once the testing dataset 222 is optimally segmented, the JSC module 216 may determine the segments with actual activities using the activity model $w_p$, which is trained based on mi-SVM formulation of the MIL classifier of Equation 4 and therefore, gets rid of the distractors in the testing dataset 222. Simultaneously, the JSC module 216 may also assign an activity label to each identified activity segment based on the inherent low-level features such as the object-based features and the MBHs stored in the database 206, as discussed above. In case the testing dataset 222 includes a segment that is unknown, i.e., for which the activity model is not trained and so its corresponding low-level features are unavailable, the JSC module 216 may associate a predefined label such as "Unseen Activity" or NULL CLASS, which may be preconfigured, dynamically configured, or provided to the JSC module 216 by the training module 212 or a user. Further, such 'NULL CLASS' label may be used to evaluate the effectiveness of the algorithm in detection of such unseen frames vis-à-vis the activity frames, as there is no explicit training for the 'NULL CLASS' label. Therefore, the DP-based segmentation (using the novel cost function of Equation 7) and the MIL classifier (mi-SVM) based labeling together operate to jointly segment and classify the egocentric video, e.g., in the testing dataset 222. The activity analysis device 110 may accordingly output a tested dataset that has been optimally segmented and appropriately classified based on the predefined activity labels. For example, the activity analysis device 110 may output a tested dataset 224 which is segmented into multiple segments 226, 228, 230, 232, and 234. In one example, the first segment 226 may be associated with a class or label "Brushing Teeth," the second segment 228 may be associated with a class or label, "Making Tea," the third segment 230 may be associated with a class or label "Watching TV," and the fourth segment 232 as well as the fifth segment 234 may be associated with a class or label "Unseen Activity."

In one embodiment, the JSC module 216 may also be configured to evaluate the accuracy of the implemented joint temporal segmentation and classification method, i.e., DP+

(mi-SVM) method. This evaluation procedure measures the capability of the activity analysis device 110 in labeling each video frame of an egocentric video, for example, in the testing dataset 222, by evaluating the percentage of the video frames that is correctly labeled in comparison to the ground-truth. The JSC module 216 may determine the accuracy by computing a ratio of the number of frame-level agreements between video frames labeled by the activity analysis device 110 and the ground truth labels, and the total number of frames.

As illustrated in a table of FIG. 7A, the quantitative evaluation of the implemented method represented by DP+(mi-SVM) and the conventional window-based classification are shown. Egocentric video sequences might also contain several activities, which were not present in the training data. They are referred as null activities. While evaluating the segmentation and classification if we ignore the sections of the video where NULL classes were present (i.e., video sections without NULL class), the activity analysis device 110 has an accuracy of 51.21% compared to the accuracy of 24.45% produced by the conventional window-based classification. Thus, the activity analysis device 110 provides an absolute improvement of 26.76%.

Figure 7B:
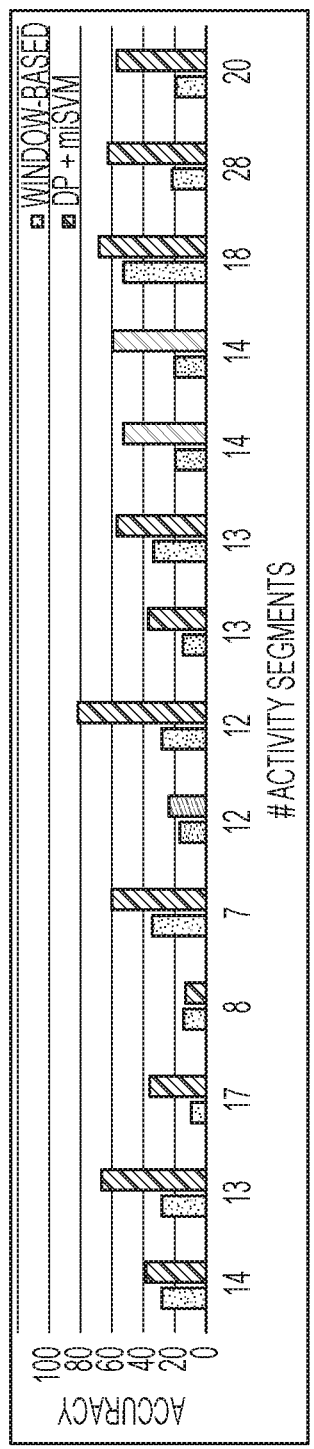
FIG. 7B is a graph that illustrates a joint segmentation and classification accuracy (without NULL class) for activities of an egocentric video, according to an embodiment of the present disclosure.

Even if the null classes are considered in the DP formulation (i.e., video sections considered to include NULL class), the DP+(mi-SVM) method implemented by the activity analysis device 110 provides an accuracy of 34.24%, which is better than 16.02% accuracy of the conventional window-based classification method, thereby providing an absolute improvement of 18.22%. The segmentation and classification accuracies for the 14 egocentric videos used as the training dataset 220 are depicted in FIG. 7B. For almost all of these sub-videos, the implemented novel DP+(mi-SVM) method has much better accuracy than the conventional window-based classification.

Figure 8:
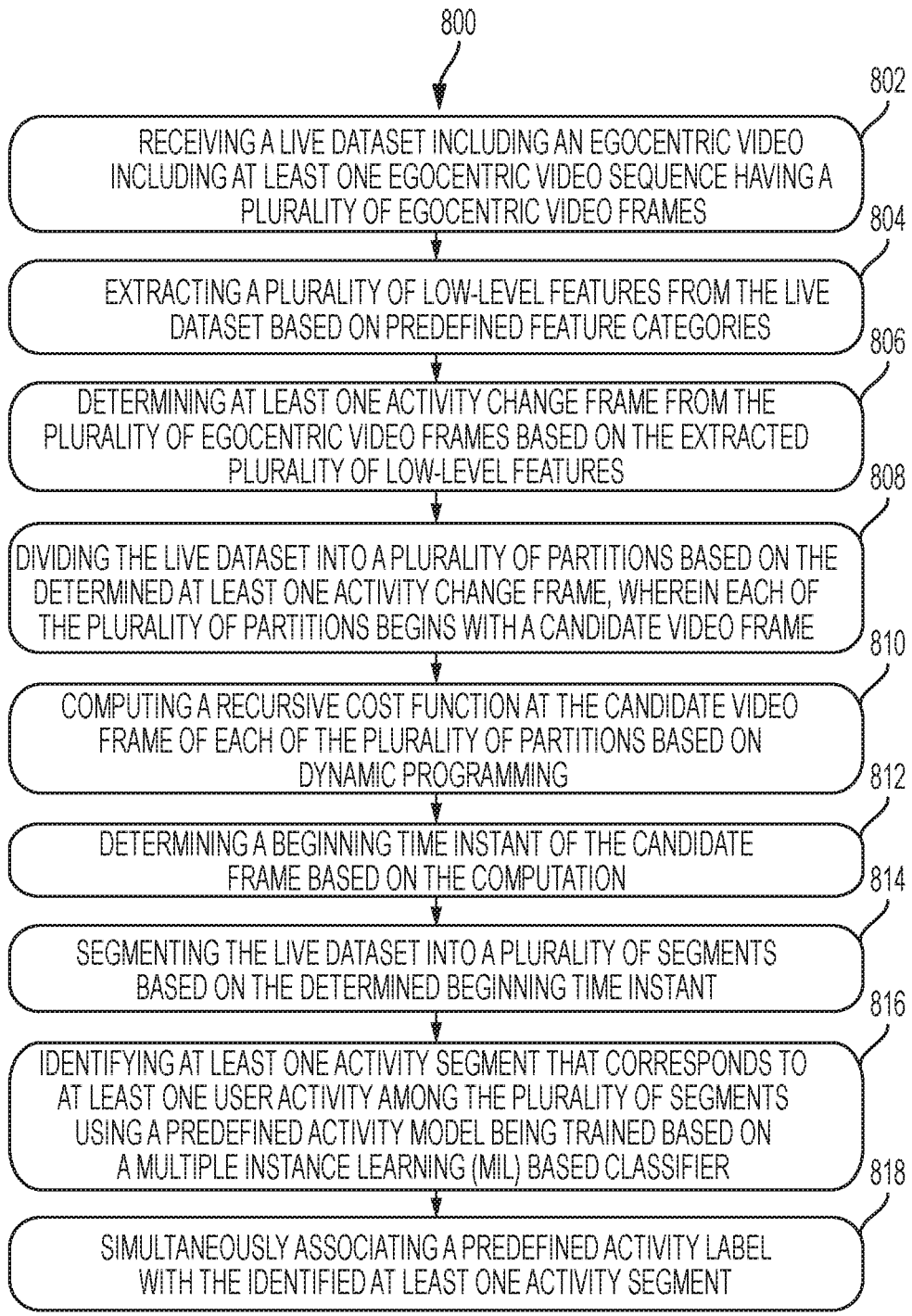
FIG. 8 illustrates an exemplary method for implementing the activity analysis device of FIG. 1A, according to an embodiment of the present disclosure.

FIG. 8 illustrates an exemplary method for implementing the activity analysis device 110, according to an embodiment of the present disclosure. The exemplary method 800 may be described in the general context of computer-executable instructions. Generally, computer executable instructions may include routines, programs, objects, components, data structures, procedures, modules, functions, and the like that perform particular functions or implement particular abstract data types. The computer executable instructions may be stored on a computer readable medium, and installed or embedded in an appropriate device for execution.

The order in which the method 800 is described is not intended to be construed as a limitation, and any number of the described method blocks may be combined or otherwise performed in any order to implement the method or an alternate method. Additionally, individual blocks may be deleted from the method without departing from the spirit and scope of the present disclosure described herein. Furthermore, the method 800 may be implemented in any suitable hardware, software, firmware, or combination thereof, that exists in the related art or that is later developed.

The method 800 describes, without limitation, implementation of the exemplary activity analysis device 110. One of skill in the art will understand that the method 800 may be modified appropriately for implementation in various manners without departing from the scope and spirit of the disclosure. The method 800 may be implemented, in at least some embodiments, by the JSC module 216 of the activity analysis device 110. For example, the JSC module 216 may be configured using the processor(s) 202 to execute computer instructions to perform operations for joint temporal segmentation and classification of activities in egocentric videos.

At 802, a live dataset including an egocentric video is received. The activity analysis device 110 may receive a live dataset including an egocentric video. The live dataset may refer to a real-world dataset that has not been pre-segmented or pre-labeled by the activity analysis device 110. In some embodiments, the activity analysis device 110 may receive a testing dataset including the egocentric video to estimate the accuracy of the activity analysis device 110. The egocentric video may include multiple egocentric video segments or sequences, each including multiple video frames. These segments may be a combination of relevant video segments and non-relevant video segments (or distractors). Unlike the distractors, the relevant video segments (also, referred to as activity segments) may correspond to activities being related to predefined set of activity class or label. For example, the user may perform multiple activities such as 'speaking on phone' while 'watching TV' and simultaneously multiple perform irrelevant actions, i.e., distractors, such as strolling back and forth from the living room to the kitchen. The activity analysis device 110 may receive the live dataset using the data input module 210 which may use the complete egocentric video or a portion thereof for being sent to the JSC module 216.

At 804, a plurality of low-level features from the live dataset are extracted based on predefined feature categories. The JSC module 216 may receive the dataset from the data input module 210 and communicate it to the feature extraction module 214, which may extract multiple low-level features from the dataset using any of the variety of feature extraction techniques known in the art, related art or developed later. In one embodiment, the feature extraction module 214 may implement the deformable parts model to compute object and motion features at every second (e.g., a gap of 30 frames between two consecutive seconds) of the video sequence. The object features may be identified as Active or Passive based on being handled by the user. The motion features may be computed based on a motion codebook that may be predetermined by the training module 212. The extracted low-level features may be stored in the database for use by the JSC module 216.

At 806, at least one activity change frame is determined from the plurality of video frames based on the extracted low-level features. When a new activity in a video sequence begins, at least, one object used by a user may change. The JSC module 216 may detect object features and their confidence scores based on the low-level features stored in the database 206 to determine one or more activity change frames.

At 808, the live dataset is divided into multiple partitions based on the determined at least one activity change frame. In one embodiment, the JSC module 216 may connect one activity change frame to another by an weighted edge. The connected frames may be represented as nodes in a graph to form a node pair. The nodes in each node pair may be separated by a predefined number of nodes or frames, for example, ten frames or nodes, which may be selected to achieve optimal trade-off between the partition accuracy and computational complexity. The graph may be then partitioned into multiple partitions using suitable graph cut technique known in the art, related art, or developed later including a normalized graph cut. The beginning frames of each partition may be used as candidate frames.

At 810, a recursive cost function is computed at the candidate frame for each of the partitions based on dynamic programming. The JSC module 216 may optimize a predefined cost function of Equation 6 for the dataset partitions by computing a recursive cost function of Equation 7 only at the candidate frames for each of the partitions. The recursive cost function may be computed using any suitable dynamic programming method known in the art, related art, or developed later including Bellman-Ford method.

At 812, a beginning time instant of the candidate frame is determined based on the computation. The JSC module 216 may solve the recursive cost function of Equation 7 using the dynamic programming method, which allows the JSC module 216 to optimally determine the beginning time instants $t_1, t_2, \ldots, t_K$ of the candidate frames. Advantageously, the use of only few selected frames, i.e., candidate frames, reduces the worst-case computational complexity of the DP approach from $O(Nt_{max})$ to $O(K_C t_{max})$ without affecting the segmentation and classification results.

At 814, the live dataset is segmented into a plurality of segments based on the determined time instants. Since the candidate frames are the beginning frames of the corresponding partitions in the live dataset, the JSC module 216 may segment the live dataset into multiple segments from the determined beginning time instants $t_1, t_2, \ldots, t_K$ of the candidate frames. The recursive cost function allows the JSC module 216 to optimally segment the egocentric video in the live dataset.

At 816, at least, one activity segment is identified that corresponds to a user activity from the plurality of segments using a trained activity model. Once the live dataset is optimally segmented into multiple segments based on dynamic programming, the JSC module 216 may identify a segment that corresponds to a user activity being related to a predefined activity class. Such identification of the activity segment may be performed based on a predefined activity model stored in the database. The activity may be pre-trained by the training module 212 based on an MIL-based classifier, which may be derived from a maximum-instance-margin SVM formulation, i.e., mi-SVM, (shown in Equation 4) of the MIL method. The activity model may be determined using on one or more bags of data, each with at least one of the instances that are related to the predefined activity class or label. The JSC module 216 uses the trained activity model to get rid of the distractors from the egocentric video in the live dataset.

At 818, a predefined activity label is associated with the identified activity segment. The JSC module 216 may simultaneously associate a predefined activity class or label with the identified activity segments. However, in case the live dataset includes a segment for which the activity model is not trained, the JSC module 216 may associate a predefined label such as "Unseen Activity" or NULL CLASS, which may be preconfigured, dynamically configured, or provided to the JSC module 216 by the training module 212. Therefore, the JSC module 216 jointly segments the live dataset and classifies the activity segments to output a final dataset, for example, the dataset 224 either directly or via an associated computing device such as the user device 102.

The above description does not provide specific details of manufacture or design of the various components. Those of skill in the art are familiar with such details, and unless departures from those techniques are set out, techniques, known, related art or later developed designs and materials should be employed. Those in the art are capable of choosing suitable manufacturing and design details.

Note that throughout the following discussion, numerous references may be made regarding servers, services, engines, modules, interfaces, portals, platforms, or other systems formed from computing devices. It should be appreciated that the use of such terms are deemed to represent one or more computing devices having at least one processor configured to or programmed to execute software instructions stored on a computer readable tangible, non-transitory medium or also referred to as a processor-readable medium. For example, a server can include one or more computers operating as a web server, database server, or other type of computer server in a manner to fulfill described roles, responsibilities, or functions. Within the context of this document, the disclosed devices or systems are also deemed to comprise computing devices having a processor and a non-transitory memory storing instructions executable by the processor that cause the device to control, manage, or otherwise manipulate the features of the devices or systems.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "processing," or "computing" or "segmenting" or "determining" or "identifying" "or receiving" or "associating," or "dividing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The terminology used herein is for the purpose of describing particular embodiments only and is not intended to be limiting of the disclosure. It will be appreciated that various above-disclosed embodiments, other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A computer-implemented method for joint temporal segmentation and classification of user activities in an egocentric video, the computer-implemented method comprising:
    receiving, using a data input module on a computer with a processor and a memory, a live dataset including an egocentric video including at least one egocentric video sequence having a plurality of egocentric video frames;
    extracting, using a feature extraction module on the computer in communication with a joint segmentation and classification (JSC) module on the computer, a plurality of low-level features from the live dataset based on predefined feature categories;
    determining, using the JSC module on the computer, at least one activity change frame from the plurality of egocentric video frames based on the extracted plurality of low-level features;
    dividing, using the JSC module on the computer, the live dataset into a plurality of partitions based on the determined at least one activity change frame, wherein each of the plurality of partitions begins with a candidate video frame;
    computing, using the JSC module on the computer, a recursive cost function at the candidate video frame of each of the plurality of partitions based on dynamic programming;
    determining, using the JSC module on the computer, a beginning time instant of the candidate frame based on the computation;
    segmenting, using the JSC module on the computer, the live dataset into a plurality of segments based on the determined beginning time instant;
    identifying, using the JSC module on the computer, at least one activity segment that corresponds to at least one user activity among the plurality of segments using a predefined activity model being trained based on a multiple instance learning (MIL) based classifier;
    simultaneously associating, using the JSC module on the computer, a predefined activity label with the identified at least one activity segment; and
    outputting, using the computer, the live dataset assigned with the predefined activity label for the at least one activity segment.

2. The computer-implemented method according to claim 1, wherein the at least one low-level feature is a combination of an object-based feature and a motion pattern captured from a first-person-view.

3. The computer-implemented method according to claim 1, further comprising:
    receiving, using a training module on the computer via the data input module, a training dataset including an egocentric video, wherein the training dataset is pre-segmented based on the predefined activity label that corresponds to the at least one user activity having a predefined time length;
    extracting, using the feature extraction module, a plurality of low-level features from the training dataset based on the predefined feature categories;
    partitioning, using the training module, the training dataset into a plurality of overlapping segments of predefined durations;
    defining, using the training module, a plurality of subsets, each including a distinct combination of overlapping segments from the plurality of overlapping segments based on a duration of the distinct combination being less than half of the predefined time length;
    determining, using the training module, a set of low-level features that belong to the plurality of subsets, wherein the set is derived from the extracted plurality of low-level features;
    grouping, using the training module, the plurality of subsets into one or more clusters based on the determined set of low-level features, wherein the one or more clusters include at least one centroid that forms a bag including a plurality of instances;
    comparing, using the training module, each of the plurality of instances with the predefined activity label;
    assigning, using the training module, the bag with a positive value if the comparison is positive for at least one of the plurality of instances, or with a negative value if the comparison is negative for all the one or more instances; and
    training, using the training module, the predefined activity model using the assigned value of the bag based on the multiple instance learning (MIL) based classifier, wherein the activity model corresponds to the at least one user activity in the training dataset.

4. The computer-implemented method according to claim 3, wherein the bag corresponds to an egocentric activity sequence.

5. The computer-implemented method according to claim 3, wherein the centroid represents a variant of the determined set of low-level features.

6. The computer-implemented method according to claim 3, wherein the positive value is a non-unity value and the negative value is a unity value.

7. A system for joint temporal segmentation and classification of at least one user activity in an egocentric video, the system comprising:
- a data input module on a computer with a processor and a memory configured to receive a live dataset including at least one egocentric video sequence having a plurality of egocentric video frames;
- a feature extraction module on the computer configured to extract a plurality of low-level features from the live dataset based on predefined feature categories; and
- a joint segmentation and classification (JSC) module on the computer configured to:
- determine at least one activity change frame from the plurality of egocentric video frames based on the extracted plurality of low-level features;
- divide the live dataset into a plurality of partitions based on the determined at least one activity change frame, wherein each of the plurality of partitions begins with a candidate video frame;
- compute a recursive cost function at the candidate video frame of each of the plurality of partitions based on dynamic programming;
- determine a beginning time instant of the candidate frame based on the computation;
- segment the live dataset into a plurality of segments based on the determined beginning time instant;
- identify at least one activity segment that corresponds to at least one user activity among the plurality of segments using a predefined activity model being trained based on a multiple instance learning (MIL) based classifier; and
- simultaneously associate a predefined activity label with the identified at least one activity segment, wherein the computer is configured to output the live dataset assigned with the predefined activity label for the at least one activity segment.

8. The system according to claim 7, wherein the at least one low-level feature is a combination of an object-based feature and a motion pattern captured from a first-person-view.

9. The system according to claim 7, further comprises a training module on the computer configured to:
- receive a training dataset including an egocentric video via the data input module, wherein the training dataset is pre-segmented based on the predefined activity label that corresponds to the at least one user activity having a predefined time length;
- partition the training dataset into a plurality of overlapping segments of predefined durations;
- define a plurality of subsets, each including a distinct combination of overlapping segments from the plurality of overlapping segments based on a duration of the distinct combination being less than half of the predefined time length;
- determine a set of low-level features that belong to the plurality of subsets, wherein the set is extracted using the feature extraction module based on the predefined feature categories;
- group the plurality of subsets into one or more clusters based on the determined set of low-level features, wherein the one or more clusters include at least one centroid that forms a bag including a plurality of instances;
- compare each of the plurality of instances with the predefined activity label;
- assign the bag with a positive value if the comparison is positive for at least one of the plurality of instances, or with a negative value if the comparison is negative for all the one or more instances; and
- train the predefined activity model using the assigned value of the bag based on the multiple instance learning (MIL) based classifier, wherein the activity model corresponds to the at least one user activity in the training dataset.

10. The system according to claim 9, wherein the bag corresponds to an egocentric activity sequence.

11. The system according to claim 9, wherein the centroid represents a variant of the determined set of low-level features.

12. The system according to claim 9, wherein the positive value is a non-unity value and the negative value is a unity value.

13. A non-transitory computer-readable medium comprising computer-executable instructions for joint temporal segmentation and classification of at least one user activity in an egocentric video, the non-transitory computer-readable medium comprising instructions for:
- receiving a live dataset including an egocentric video including at least one egocentric video sequence having a plurality of egocentric video frames;
- extracting a plurality of low-level features from the live dataset based on predefined feature categories;
- determining at least one activity change frame from the plurality of egocentric video frames based on the extracted plurality of low-level features;
- dividing the live dataset into a plurality of partitions based on the determined at least one activity change frame, wherein each of the plurality of partitions begins with a candidate video frame;
- computing a recursive cost function at the candidate video frame of each of the plurality of partitions based on dynamic programming;
- determining a beginning time instant of the candidate frame based on the computation;
- segmenting the live dataset into a plurality of segments based on the determined beginning time instant;
- identifying at least one activity segment that corresponds to at least one user activity among the plurality of segments using a predefined activity model being trained based on a multiple instance learning (MIL) based classifier;
- simultaneously associating a predefined activity label with the identified at least one activity segment; and
- outputting the live dataset assigned with the predefined activity label for the at least one activity segment.

14. The non-transitory computer-readable medium according to claim 13, wherein the at least one low-level feature is a combination of an object-based feature and a motion pattern captured from a first-person-view.

15. The non-transitory computer-readable medium according to claim 13, further comprising instructions for:
- receiving a training dataset including an egocentric video, wherein the training dataset is pre-segmented based on the predefined activity label that corresponds to the at least one user activity having a predefined time length;
- extracting a plurality of low-level features from the training dataset based on the predefined feature categories;
- partitioning the training dataset into a plurality of overlapping segments of predefined durations;
- defining a plurality of subsets, each including a distinct combination of overlapping segments from the plurality of overlapping segments based on a duration of the distinct combination being less than half of the predefined time length;

determining a set of low-level features that belongs to the plurality of subsets, wherein the set is derived from the extracted plurality of low-level features;

grouping the plurality of subsets into one or more clusters based on the determined set of low-level features, wherein the one or more clusters include at least one centroid that forms a bag including a plurality of instances;

comparing each of the plurality of instances with the predefined activity label;

assigning the bag with a positive value if the comparison is positive for at least one of the plurality of instances, or with a negative value if the comparison is negative for all the one or more instances; and training the predefined activity model using the assigned value of the bag based on the multiple instance learning (MIL) based classifier, wherein the activity model corresponds to the at least one user activity in the training dataset.

16. The non-transitory computer-readable medium according to claim 15, wherein the bag corresponds to an egocentric activity sequence.

17. The non-transitory computer-readable medium according to claim 15, wherein the centroid represents a variant of the determined set of low-level features.

18. The non-transitory computer-readable medium according to claim 15, wherein the positive value is a non-unity value and the negative value is a unity value.

* * * * *